3,740,192
METHOD FOR THE PREVENTION OF FOULING OF SHIPS

Oystein E. Rasmussen, 119 Hosleveien, 1340 Bekkestua, Norway
No Drawing. Filed Oct. 20, 1970, Ser. No. 82,504
Claims priority, application Norway, Oct. 30, 1969, 4,302
Int. Cl. B63b 59/00
U.S. Cl. 21—58                            4 Claims

ABSTRACT OF THE DISCLOSURE

Fouling of a ship is prevented by distributing ozone over the underwater surface of the ship. The ozone is passed into the sea continuously or periodically through perforations in or at the underwater surface of the ship, in form of pure ozone or ozone-enriched compressed air.

---

The present invention relates to a method for prevention of fouling of ships and the like.

At the present time, application of paints of the so-called "anti-fouling" type is generally used for the prevention of fouling of ships. This is a paint incorporating toxic substances which diffuse in the sea water adjacent the ship's side and kill any living organisms so that they have no opportunity of attaching themselves to the ship's surface. In the main, fouling occurs when the ship is in harbour where there are no substantial currents.

Various other methods have been proposed for distributing the toxic substances over the surface of the ship. The substances have, for example, been distributed in liquid state beneath the water, possibly by means of a carrier. In U.S. Ser. No. 29,502 filed Apr. 17, 1970, now U.S. Pat. No. 3,650,924, it is also proposed to utilize the electrolytic decomposition products, produced by electrolysis of sea water, which are distributed along the side of the ship by means of a special system.

The aim of the present invention relates to a further possibility for prevention of fouling and is characterized in that ozone is distributed over the underwater surface of the ship.

Ozone is known as a strong disinfectant and sterilizing agent and has been found useful, amongst other things, in the purifying of drinking water. The deadly effect of ozone both on animal and vegetable plankton and the like has been proved and described in many literature sources. G. Bringmann, Zeitschrift für Hygiene, volume 139 (1954), 8, pages 333 to 337 may be mentioned in this connection. It is, however, the effect in fresh water which is described and not in relation to the form of fouling occurring particularly on ships.

It has now been found that the same effect can also be utilized to prevent growth of algae and plankton and other marine growth, particularly in protection of ships. This has not been envisaged hitherto and presents an unexpected and novel method for the prevention of fouling of ships. It has not been thought possible hitherto to use ozone for this purpose in consideration of the large surfaces to be protected. Particularly inasmuch as ozone is expensive to produce and it has not been possible to distribute the ozone in a rational manner.

By means of a suitable distribution of the ozone, however, an effective utilization of the substance is achieved such that it is in fact very suitable for this purpose.

In accordance with the invention, the method is further characterized in that the ozone is passed into the sea through perforations in the underwater surface of the ship. Perforated means may also be used at the ship underwater surface. The perforation is preferably placed adjacent to the bilge keel.

Any type of the above mentitoned distribution systems having perforations may be used for this purpose; however, as an example of a particularly advantageous embodiment of such a system, reference is made to that used for electrolytic decomposition products of sea water in U.S. Pat. No. 3,650,924, whereby an ozonisator is used instead of the electrolyzer. Such system may then be used only with ozone or together with the air curtain.

The method according to the invention is further characterized in that the ozone is passed out and distributed in the form of ozone-enriched compressed air. In this manner, good distribution of the ozone is achieved and, at the same time, a rate of flow is imparted to the water closest to the ship's side, by means of the compressed air, that the possibility of attachment of marine growth to the ship's side is reduced.

A further feature of the method according to the invention is that the ozone is distributed over the side of the ship at short intervals or periods, with longer intermediate periods of cessation. Since the ozone is extremely fast-acting it is sufficient to release the ozone along the ship's side in brief periods, for example, 1–5 minutes with a determined cessation, for example, 1–2 hours, possibly more. In this manner, the amount of ozone used will be less and, since the ozone is expensive to produce, the method for prevention of fouling is therefore less expensive in operation without detracting from its efficiency.

The ozone may also be distributed periodically and alternately over different sections of the ship's surface.

The distribution means for this purpose, may, for example, be as disclosed in U.S. Pat. No. 3,650,924, where air is passed both perpendicularly and horizontally along areas adjacent the ship's side so that a type of pocket effect is achieved and the side of the ship is thereby divided into areas or sections. By means of a suitable valve arrangement in the distribution system, ozone may be supplied to these areas or sections individually and it is then possible, after a brief treatment period, for example, 1–5 minutes, to stop the supply of ozone and to supply ozone to another area. The great advantage of this method is that the ozone apparatus may be of small capacity and in continuous operation, since the ozone is to be supplied to a small area at the time. This is particularly important since the ozone is rapidly decomposed and storage of ozone would thus entail difficulties. The maintenance of a large ozone apparatus capable of providing ozone to the entire side of the ship would be extremely expensive and would consequently increase substantially the cost of the protection method.

When distributing ozone to one or few sections at the time, it is expedient to supply compressed air to the other sections simultaneously, so that ozone is conveyed to the side of the ship and to the various sections alternately with compressed air. The areas which at any particular time are not protected by ozone being then treated with compressed air and are flushed with air, which to a certain extent is also contributive in repelling marine growth.

It is thus possible by means of this method of distribution to give longer periods of ozone treatment to areas of the ship's side which are particularly subject to marine growth, than to the other areas which are less subject to fouling.

Having described my invention I claim:

1. A method for preventing the fouling of the underwater surface of a ship or other marine structure, comprising the step of flowing over said underwater surface bubbles of air to which ozone has been added to include a sufficient concentration of ozone to substantially completely prevent fouling, the agitation of the water produced by said bubbles being by itself insufficient to prevent fouling.

2. Method according to claim 1, characterized in that ozone is passed out and distributed in the form of ozone-enriched compressed air.

3. The method of claim 1 and including the further step of
limiting dispensing of ozone to only a section of an underwater surface at a given time, and alternating such dispensing over a plurality of sections of the underwater surfaces so as to treat the entire underwater surface with a minimum amount of ozone-producing equipment.

4. Method according to claim 3, characterized in that ozone is supplied to the sections alternately with compressed air.

References Cited
UNITED STATES PATENTS

| | | | |
|---|---|---|---|
| 569,173 | 10/1896 | Cassel | 21—61 |
| 1,039,824 | 10/1912 | Schumacher | 21—7 |
| 1,673,539 | 6/1928 | Warff | 21—61 UX |
| 1,973,813 | 9/1934 | Kelley | 21—2 UX |
| 2,138,831 | 12/1938 | Brammer | 21—2 UX |

MORRIS O. WOLK, Primary Examiner

D. G. MILLMAN, Assistant Examiner

U.S. Cl. X.R.

114—222